Figure 1:
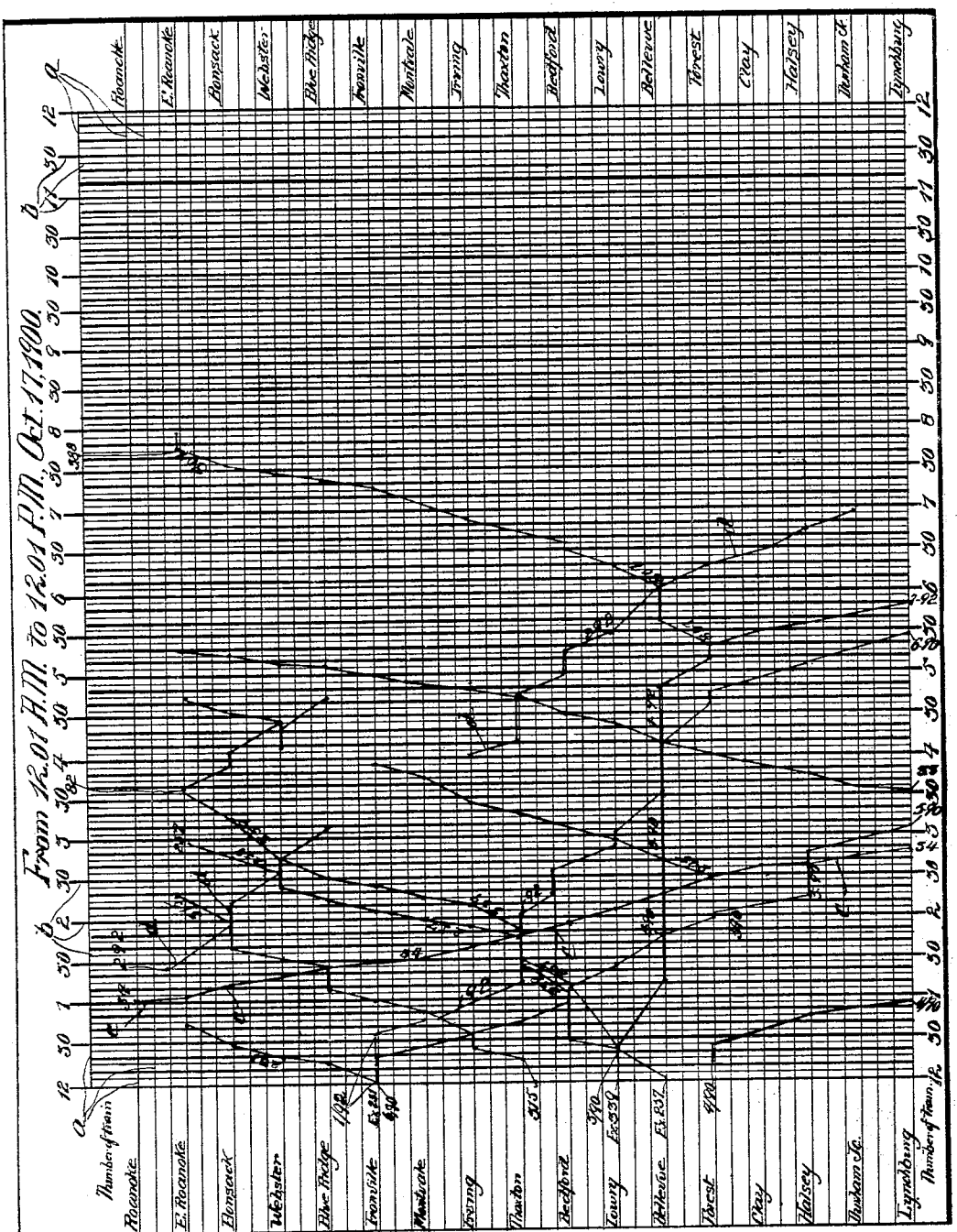

No. 684,427. Patented Oct. 15, 1901.
F. B. HENRETTA.
GRAPHIC RECORD FOR LOCATING MOVING TRAINS.
(Application filed Nov. 13, 1900.)

(No Model.) 2 Sheets—Sheet 1.

Witnesses
F. B. Henretta, Inventor
By C. A. Snow & Co.
Attorneys

No. 684,427. Patented Oct. 15, 1901.
F. B. HENRETTA.
GRAPHIC RECORD FOR LOCATING MOVING TRAINS.
(Application filed Nov. 13, 1900.)
(No Model.) 2 Sheets—Sheet 2.
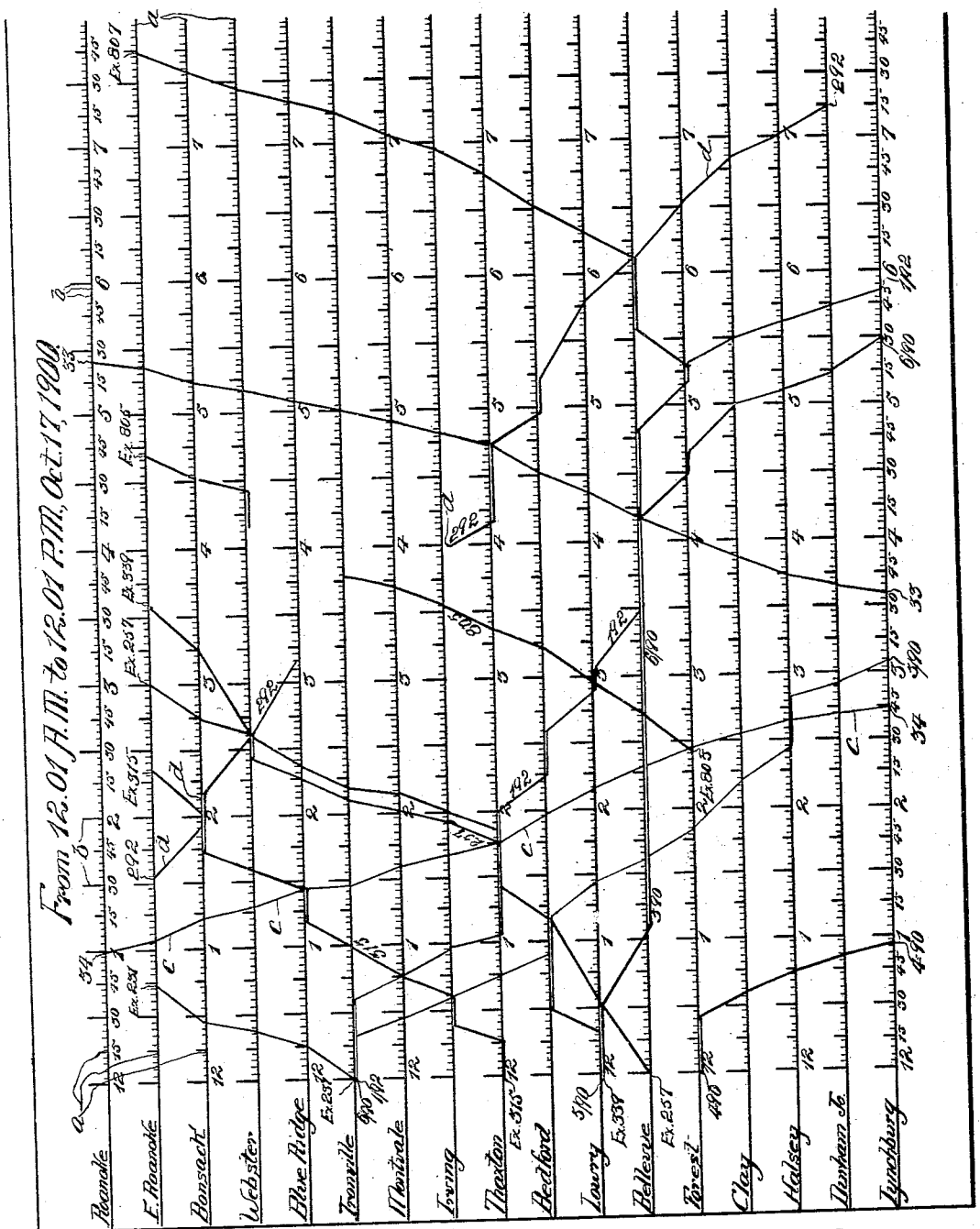

UNITED STATES PATENT OFFICE.

FRANCIS BERNARD HENRETTA, OF ROANOKE, VIRGINIA.

GRAPHIC RECORD FOR LOCATING MOVING TRAINS.

SPECIFICATION forming part of Letters Patent No. 684,427, dated October 15, 1901.

Application filed November 13, 1900. Serial No. 36,399. (No model.)

*To all whom it may concern:*

Be it known that I, FRANCIS BERNARD HENRETTA, a citizen of the United States, residing at Roanoke, in the county of Roanoke and State of Virginia, have invented a new and useful Method of Recording the Progress of a Moving Train, of which the following is a specification.

This invention relates to means for recording the running of trains and for giving in a graphic manner a history of each run of a train over a road or portion of a road, the object of the invention being to provide a record and a method of forming the record wherein the time of starting of a train from one terminus of its run and its time of arriving at and leaving each subsequent point with which telegraphic communication is had may be indicated on a chart in a manner to form a permanent record or history of that run.

A further object of the invention is to provide for showing the length of time spent at each stop, the time consumed in running between each two points, and also to show the time distance separating two or more trains running at the same time in the same direction.

Additional objects of the invention are to provide for showing any failure of an operator to send in his report of the arrival or departure of a train from his station and the length of each lay-over, to show the places and times of passing of trains, and for various other purposes, all of which will be understood from the following description.

In the drawings, forming a portion of this specification, there is shown a chart giving a history of the movements of a number of trains on a division of a railroad.

Figure 1 represents a chart wherein the time periods are marked off by continuous lines. Fig. 2 shows a chart wherein the time periods are marked off by short lines reaching only slightly above the transverse lines.

Referring now to the drawings, there is shown a chart which is divided by transverse lines $a$, representing points on the road, and vertical lines $b$, which represent divisions of time, the lines $b$ extending above the uppermost line $a$. The lines $b$, that represent the hours and half-hours, are continued above the remaining vertical lines to make them more prominent, and the hour-lines are marked to indicate the twelve hours of half of a day or, if preferred, the whole day or any portion of it, the chart shown being marked for half a day. The markings of the present chart begin with "12" a. m. and run to "12" p. m. There are five lines $b$ between each pair of extended lines, dividing the space into periods of five minutes each, and these intermediate lines may be distinguished by making the alternate lines heavier or of a different color, or in any other desired manner.

At both the right-hand end and the left-hand end of the chart are marked the names of the stations along the road, and for convenience to prevent confusion on the chart these station-names are spaced several lines apart, as shown. The lines $b$, which represent the hours and half-hours, project also at the bottom of the chart beyond the remaining lines.

The manner of using the chart is as follows: When a train starts upon a run or comes into that portion of a complete record represented by a chart, the point at which the record begins is represented by a dot made at the point of intersection of the line bearing the name of the station where the run begins and the vertical line $b$ representing the time at which that run begins. If the run does not begin at any regular interval of time represented by a vertical line $b$, then the dot is made between two lines $b$ and on the proper line $a$ in a position to show approximately the time, although of course each line $a$ may have divisions marked thereon to represent the minutes between two lines $b$ or fraction of minutes, so that the record may be absolute. The dot thus made is marked with the number of the train to be recorded.

Supposing, for instance, a train No. 34 enters the division at Roanoke at one o'clock a. m., the agent makes a dot at the intersection of the line $a$ marked "Roanoke" and the line $b$ marked "1," indicating that the train left Roanoke at one o'clock a. m. When the train reaches East Roanoke, the agent at that place sends his despatch to Roanoke, stating that the train passed his station at 1.04, whereupon the agent or despatcher, whichever he be, at Roanoke makes a dot on the line $a$ marked "East Roanoke" at a point sufficiently close to the 1.05 line $b$ to indicate 1.04 and connects this second dot with the first dot by means of a line $c$, which leads diagonally from the upper left-hand portion of the chart in the direction of the lower right-hand portion. This train being an express-train, there is no stop made at East Roanoke, and the next station heard from is Bonsack, from which a despatch is sent to Roanoke to the effect that train No. 34 passed that place at 1.12, when the man at Roanoke makes the dot on the line $a$ marked "Bonsack" and connects it with the dot on the line marked "East Roanoke," this operation being repeated throughout the run of the train, with the result that a succession of dots placed on the lines $a$ opposite to the station-names will be connected by a series of short straight lines $c$ to form a single crooked line, the lines acting to guide the eye where a number of records are marked on the same chart, while the positions of the dots—that is, the points of intersection of the lines $c$ with the lines $a$ relatively to the lines $b$—indicate the times at which the train passed the corresponding stations corresponding to the lines $a$.

In the record of the train numbered 292, at the top of the chart, there is shown the laxity of the agents at Ironville and Montvale, and this record shows also the manner of recording the stops at stations.

By reference to the line $d$, which is marked "292," it will be seen that the train left East Roanoke at 1.25 a. m. The train arrived at Bonsack at 2 o'clock and left at 2.12½. The agent at Bonsack sent his despatch to this effect to East Roanoke, and the despatcher at that place made a dot on line $b$ opposite to "Bonsack" at the point of intersection of the two-o'clock line $b$ therewith and a second dot on the same line $a$ midway between the 2.10 line $b$ and the 2.15 line $b$ and then connected these two dots with a line $d$, and also connected the East Roanoke line $a$ at its intersection with the 1.25 line $b$ by a line $d$, with the dot made on the Bonsack line $a$ at the point of intersection of the two-o'clock line therewith. As the dots on the Bonsack line $a$ extend through a period of twelve and one-half minutes, it shows that the train laid over at Bonsack for that length of time. It will be noted that there is no line $d$ connecting Blue Ridge with Ironville, Ironville with Montvale, nor Montvale with Irving. The chart shows that a despatch was received from Blue Ridge that the train passed through that place at three o'clock and no further despatch was received regarding the train until Irving was heard from, to the effect that the train passed through that place at 4.02. From Irving to Durham Junction the lines $d$ are continued without break, showing that despatches were received from the remaining stations. As no despatches were received from Ironville or Montvale, no record was made, and this gap shows in a permanent manner that the agents at these two stations were absent from their posts or failed to send in their despatches. In the record of this train 292 it is shown that at 6.02 a. m. it passed train No. 807 at Bellevue, while the record of train 807 shows that it left Forest at 5.20, reached Bellevue at 5.40, and laid there until 6.02 to pass train No. 292, and then proceeded to East Roanoke without stopping, excepting at Bedford for a period of five minutes, from 6.30 to 6.35, it being understood that train No. 807 is traveling in a direction opposite to train No. 292.

Referring now to the line $a$ leading from Ironville, it will be seen that express No. 231 left that place for Roanoke at twelve o'clock and made no stops, train 192 stood on the track at Ironville from 12 o'clock until 1.35 and then started in the opposite direction for Lynchburg, and that train 690 stood on the track at Ironville from 12 o'clock until 12.18 and then started for Lynchburg, thus leaving in advance of train 192. Train 690 ran straight through to Bedford, where it stopped ten minutes and then continued to Bellevue, where it arrived at 1.45 and where it laid over until 4.10 and then continued to Lynchburg, stopping ten minutes at Forest and arriving at Lynchburg at 5.26. While lying at Bellevue, train 690 was passed by trains No. 34, 590, and 192 going in the same direction and by train No. 33 going in an opposite direction.

It will thus be seen that the entire history of the movement of a train is recorded as the train progresses from one station to another and that a glance at the chart during the making of the chart will show the despatcher just how the trains lie with respect to each other, where delays have occurred, if any, where they can be best made up, and what agents are lax, and when the chart is completed the operation of the division for the period embraced by the chart is shown. Furthermore, the chart may be used in plotting the runs of the different trains, the proximity of two lines representing trains traveling in the same direction, indicating the number of minutes between the running times of the two trains. Further uses and advantages of the chart and the method of making it will be evident to those skilled in the art.

In Fig. 2 of the drawings there is shown a chart having the same general structure as that just described, and to which the foregoing description equally refers, the time intervals being spaced off by means of short lines reaching only slightly above the transverse lines instead of continuous lines, the long lines being more confusing than the shorter lines, as will be seen.

What is claimed is—

The method of recording the progress of a moving train as it passes from one despatch-station to another as set forth in despatches successively received, and of positively recording absence or failure of duty of operators at the stations along the route, which consists in plotting a line in sections, each corresponding to a despatch-station, and extending each section diagonally to indicate lapse of time and distance traveled, or transversely to indicate lapse of time without movement of the train, as each despatch is received and in conformity with the information contained therein, and in leaving a gap in the line between stations to indicate failure of receipt of despatches from an intermediate station or stations.

In testimony that I claim the foregoing as my own I have hereto affixed my signature in the presence of two witnesses.

FRANCIS BERNARD HENRETTA.

Witnesses:
R. C. HALE,
S. E. BICKFORD.